United States Patent [19]

Ogino

[11] Patent Number: 5,428,590
[45] Date of Patent: Jun. 27, 1995

[54] INFORMATION RECORDING AND REPRODUCING APPARATUS AND METHOD IN WHICH AN INFORMATION RECORDING OR REPRODUCING HEAD SEEKS A DESIRED TRACK ON A RECORDING MEDIUM

[75] Inventor: Tsukasa Ogino, Kawasaki, Japan

[73] Assignee: Canon Kabushiki Kaisha, Tokyo, Japan

[21] Appl. No.: 288,886

[22] Filed: Aug. 10, 1994

Related U.S. Application Data

[63] Continuation of Ser. No. 890,179, May 29, 1992, abandoned.

[30] Foreign Application Priority Data

Jun. 4, 1991 [JP] Japan .................. 3-159503
Jun. 4, 1991 [JP] Japan .................. 3-159505

[51] Int. Cl.6 .................................. G11B 7/00
[52] U.S. Cl. .................. 369/44.28; 369/32; 360/78.06
[58] Field of Search ........... 369/44.28, 32, 41, 54, 369/44.29, 44.34; 360/78.04, 78.05, 78.14, 78.06, 78.08; 318/568.18, 568.22

[56] References Cited

U.S. PATENT DOCUMENTS

| | | | |
|---|---|---|---|
| 4,524,398 | 6/1985 | Fujiki | 360/78 |
| 4,677,507 | 6/1987 | Elliott | 360/78 |
| 4,835,752 | 5/1989 | Nakatsu et al. | 369/41 |
| 4,920,462 | 4/1990 | Couse et al. | 360/78.04 |
| 5,020,044 | 5/1991 | Shimonou | 369/44.28 |
| 5,033,037 | 7/1991 | Yanagi | 369/44.28 X |
| 5,146,440 | 9/1992 | Yamaguchi et al. | 369/32 |
| 5,191,566 | 3/1993 | Yamaguchi et al. | 369/44.28 |

FOREIGN PATENT DOCUMENTS 0409574 1/1991 European Pat. Off. .
WO8908917 9/1989 WIPO .

*Primary Examiner*—A. Psitos
*Assistant Examiner*—Thang V. Tran
*Attorney, Agent, or Firm*—Fitzpatrick, Cella, Harper & Scinto

[57] ABSTRACT

An information recording-reproducing apparatus in which the seeking operation of an information recording/reproducing head is effected while controlling the velocity of the head. The head is moved by a linear motor in a direction to traverse the tracks provided on a recording medium. During the movement of the head, a tracking error signal is generated and is detected. The moving velocity of the head is detected at every predetermined period. The linear motor is controlled in synchronization with the velocity detection so that the head moves in conformity with a predetermined target velocity on the basis of the detected moving velocity.

6 Claims, 9 Drawing Sheets

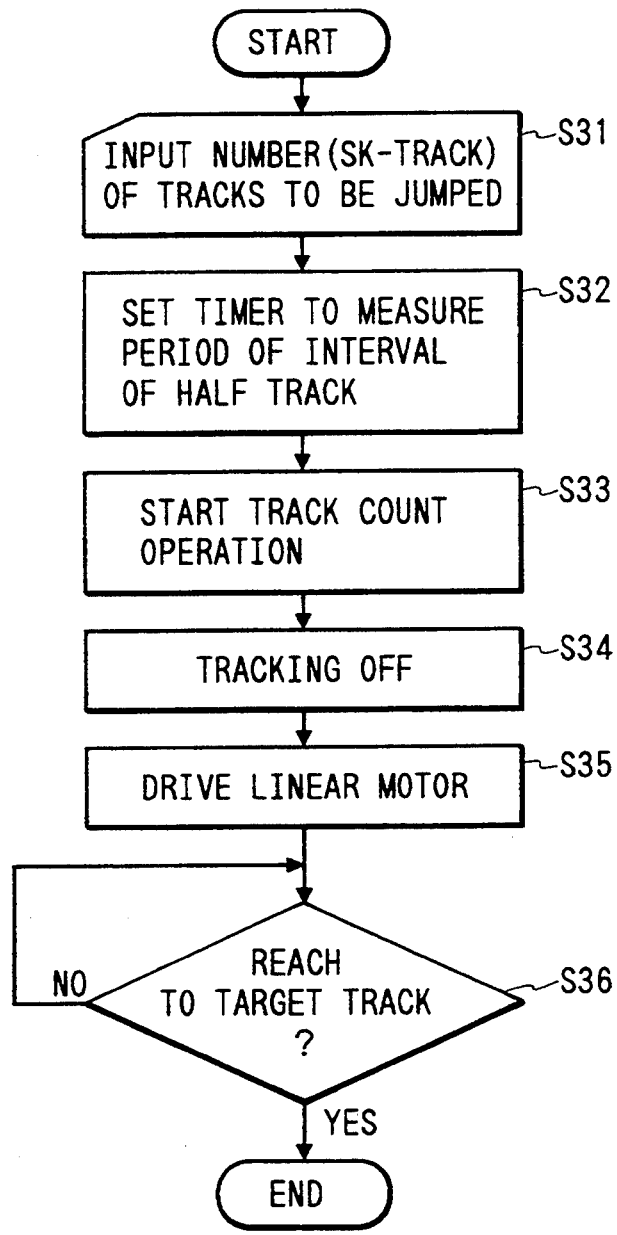

INFORMATION RECORDING AND REPRODUCING APPARATUS AND METHOD IN WHICH AN INFORMATION RECORDING OR REPRODUCING HEAD SEEKS A DESIRED TRACK ON A RECORDING MEDIUM

This application is a continuation of prior application, Ser. No. 07/890,179 filed May 29, 1992, now abandoned.

BACKGROUND OF THE INVENTION

1. Field of the Invention

The invention relates to an information recording and reproducing apparatus for recording or reproducing information onto/from an information recording medium such as magnetic disc, magnetooptic disc, or the like and, more particularly, to a velocity control apparatus used during a seeking operation of a head which is used to record or reproduce information.

2. Related Background Art

Hitherto, as a seeking method of moving an information recording or reproducing head to a target position on an information recording medium, a method whereby the velocity of the head is always monitored and the head is allowed to reach a target position while controlling the velocity of the head in accordance with a predetermined movement schedule is generally known. FIG. 1 is a diagram showing the relations among a reference velocity and an actual velocity in the above general velocity control method and a current applied to an actuator for driving the head. In the diagram, a reference velocity $V_{ref}$ denotes a velocity based on a movement schedule of the head and is calculated in accordance with the remaining distance to a target position. The reference velocity $V_{ref}$ is obtained by the following equation.

$$V_{ref} = [2 \cdot \alpha (S - \lambda/2 \cdot N)]^{\frac{1}{2}} \qquad (1)$$

where,

S: target moving distance
$\alpha$: deceleration/acceleration
N: count value on a zero-cross point after the start of the seeking operation The actual velocity of the head is sequentially detected in order to allow the head velocity to follow the reference velocity. For signal is detected. A time $\Delta t_n$ which is required instance, the zero-cross point of a tracking error point is measured. A current velocity $V_n$ of the head from the zero-cross point to the next zero-cross is calculated from the time $\Delta t_n$ and a track pitch $\lambda$ in accordance with the following equation.

$$V_n = \lambda/2 \times 1/\Delta t_n \qquad (2)$$

The distance between the zero-cross points is equal to $\frac{1}{2}$ of the track pitch $\lambda$.

When the velocity of the head is controlled, a command value of an actuator is calculated every predetermined period from the current velocity and the target velocity at that time. The head velocity is controlled by the obtained command value. A command value $A_{ct}$ is calculated by the following equation.

$$A_{ct} = K(V_{ref} - V_n) \qquad (3)$$

(K: feedback gain of the velocity control system)

According to the conventional method as mentioned above, the head velocity is always detected and the command value obtained from the detected velocity of the head and the target velocity is fed back every predetermined period. Due to this, the head is moved in conformity with the target velocity as shown in FIG. 1 and seeks to the target position in accordance with the predetermined movement schedule.

However, according to the above conventional velocity control method, since the head velocity is obtained only for every track crossing operation, in the case where a velocity control of a predetermined period is executed irrespective of the track crossing period, as shown in FIG. 2, for example, when the velocity control is performed at a point $P_c$, the velocity obtained at a point $P_c'$ is used, so that a time delay of $\Delta t_c$ occurs during such a duration. Even at points $P_b$ and $P_a$, time delays of $\Delta t_b$ and $\Delta t_a$ also similarly occur. Therefore, the velocity at the point $P_c$ is set to c' and has a value different from the real velocity c. Likewise, the velocity at the point $P_b$ is set to b' for the real velocity b. The velocity at the point $P_a$ is also set to a' for the real velocity a. In such a conventional method, since a large error occurs in the head velocity due to a deviation between the detection timing of the velocity and the control timing, it is difficult to accurately control the seeking operation of the head.

SUMMARY OF THE INVENTION

The present invention is designed to solve the above problems and it is an object of the invention to provide an information recording and reproducing apparatus in which by synchronizing the velocity detection with the velocity control, the seeking operation of the head can be accurately controlled.

According to the invention, the above object is accomplished by an information recording and reproducing apparatus in which an information recording or reproducing head seeks to a desired track on a recording medium having a plurality of tracks while controlling the velocity of the head, wherein the apparatus comprises: means for moving the head in such a direction as to traverse the tracks; means for detecting a tracking error signal which is generated when the head is moved by the moving means; and control means for detecting a moving velocity of the head at every predetermined period of the tracking error signal and for controlling the moving means synchronously with the velocity detection so that the head moves in accordance with a predetermined target velocity on the basis of the detected moving velocity.

BRIEF DESCRIPTION OF THE DRAWINGS

FIG. 9 is a flowchart showing another overall velocity control operation of the optical head according to the embodiment shown in FIG. 3.

DETAILED DESCRIPTION OF THE PREFERRED EMBODIMENTS

Figure 3:
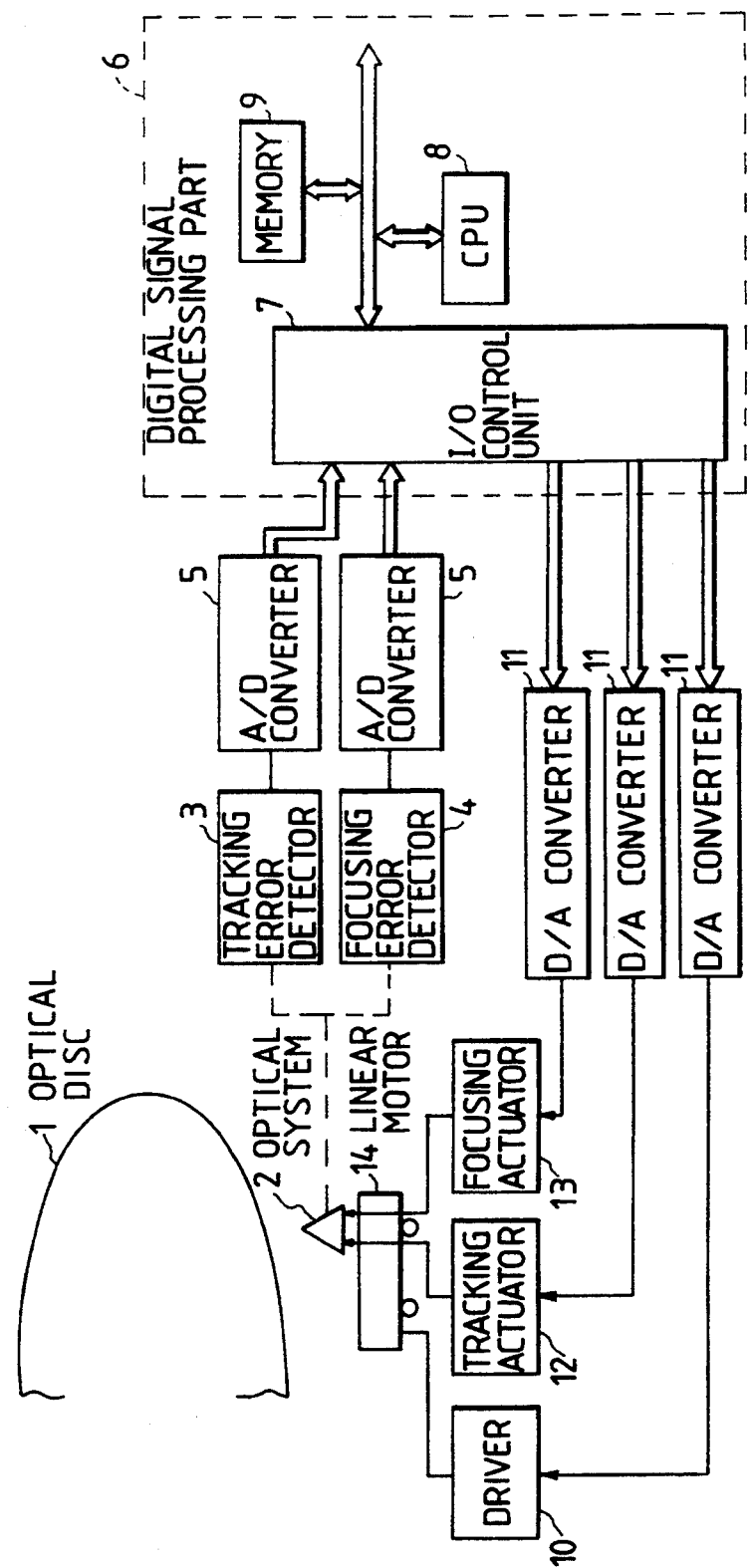
FIG. 3 is a block diagram showing an embodiment of an information recording and reproducing apparatus of the invention.

An embodiment of the invention will be described in detail hereinbelow with reference to the drawings. FIG. 3 is a block diagram showing an embodiment of an information recording and reproducing apparatus of the invention. FIG. 3 shows an example of an optical disc apparatus.

In FIG. 3, reference numeral 1 denotes an optical disc functioning as an information recording medium. The optical disc 1 is rotated at a constant velocity by the driving of a driving system (not shown). Reference numeral 2 denotes an optical system for optically recording information onto the optical disc 1 or for reproducing the information recorded on the optical disc 1. The optical system 2 comprises a semiconductor laser as a light source for recording and reproducing information, various optical parts to execute predetermined optical processes on a laser beam generated from the semiconductor laser, a sensor to detect the reflected light from the optical disc 1, and the like. Reference numeral 12 denotes a tracking actuator to move a converging objective lens (not shown) provided in the optical system 2 in the tracking direction and 13 indicates a focusing actuator to move the objective lens in the focusing direction. The optical system 2 and the two actuators are assembled in the optical head and can be moved in the radial direction of the optical disc 1. Reference numeral 14 denotes a linear motor to move the optical head in the radial direction of the optical disc 1, and 10 indicates a driver to drive the linear motor 14.

Reference numeral 3 denotes a tracking error detector to detect a tracking error signal on the basis of a sensor output in the optical system 2 and 4 indicates a focusing error detector to similarly detect a focusing error signal on the basis of the sensor output. The error signals detected by those error detectors are converted into the digital signals by A/D converters 5, respectively, and are supplied to a digital signal processing part 6. The digital signal processing part 6 functions as a main control unit of the optical disc apparatus of the embodiment and comprises: an I/O control unit 7 to control the input and output of the signals; a CPU 8 to execute arithmetic operating processes necessary for the control is accordance with a predetermined control program; and a memory 9 to store various data which are used in the control. The digital signal processing part 6 has a function to control the velocity at a time when the optical head performs the seeking operation. In the velocity control, the control is executed synchronously with a zero-cross point at which the velocity control timing is equal to the velocity detecting timing as will be explained in detail hereinbelow. In the case of controlling the seeking operation of the optical head, the CPU 8 calculates a command value to the driver 10 of the linear motor 14. The command value is sent to a D/A converter 11 through the I/O control unit 7 and converted into the analog value. After that, the analog value is given to the driver 10. Similarly, the command values for the tracking actuator 12 and focusing actuator 13 are also sent from the CPU 8 to D/A converters 11 through the I/O control unit 7, respectively, and are converted into the analog signals. After that, the analog signals are supplied to the tracking actuator 12 and focusing actuator 13.

Figure 4:
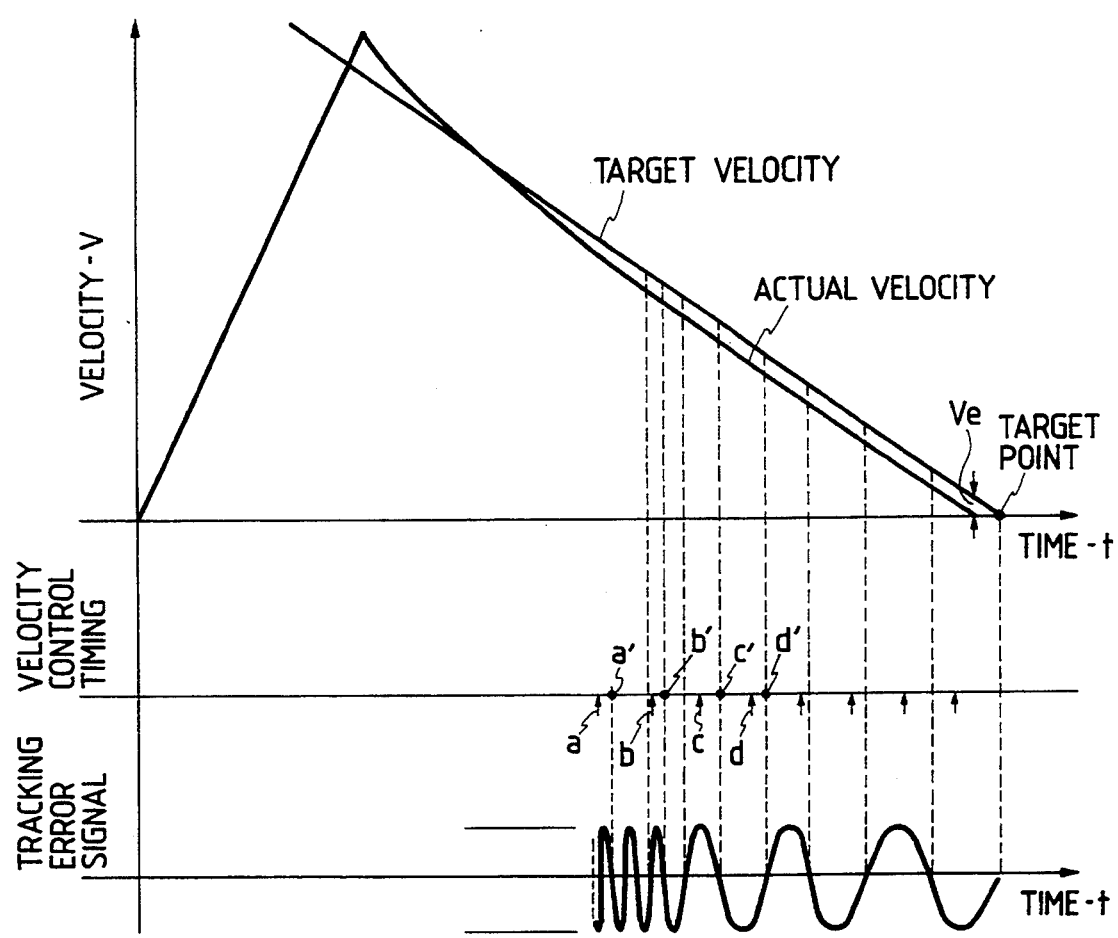
FIG. 4 is a timing chart showing the relations among the target velocity of an optical head, the actual velocity, the velocity control timing, and the tracking error signal in a velocity control of the optical head according to the embodiment shown in FIG. 3.
Figure 5:
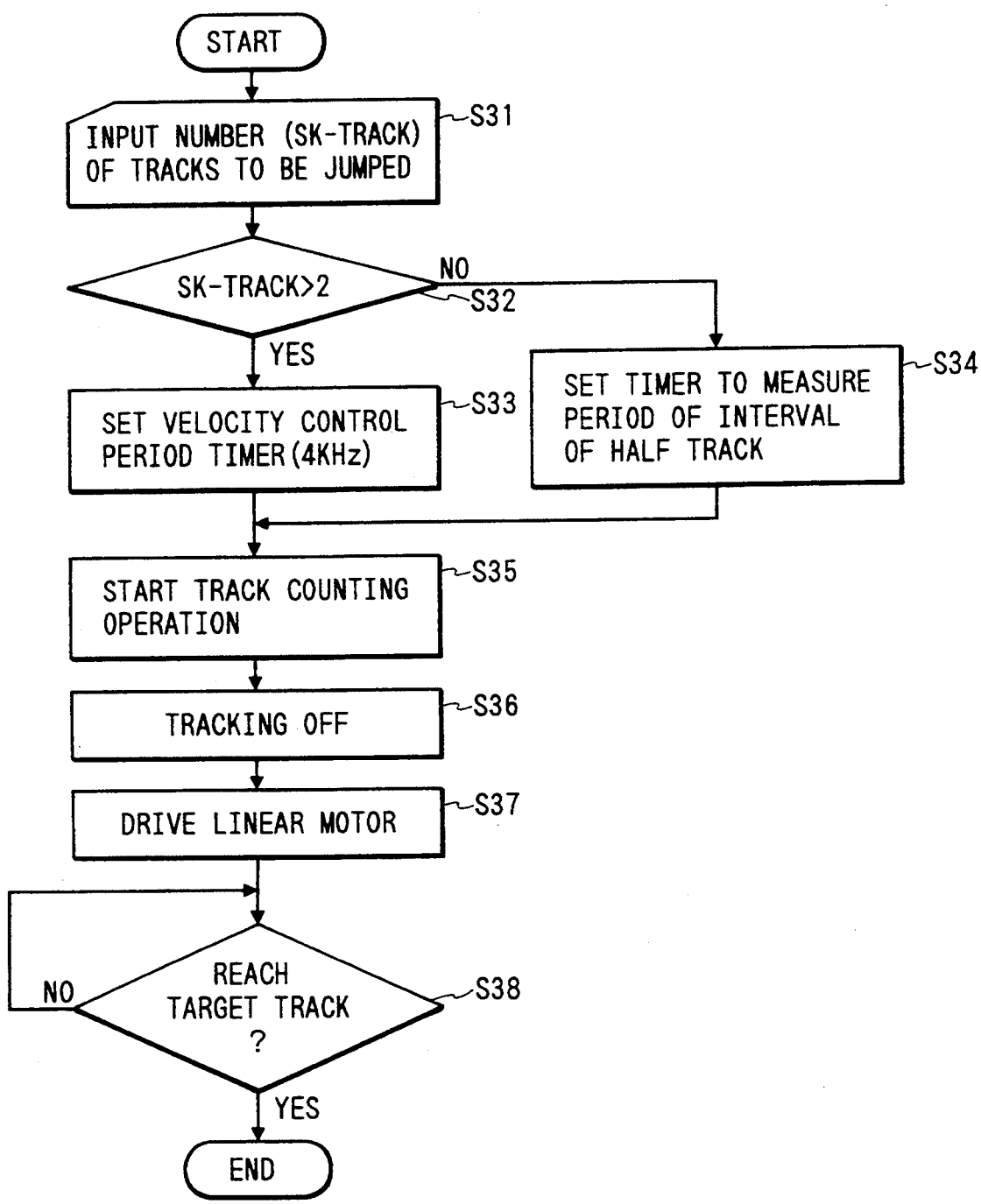
FIG. 5 is a flowchart showing an overall velocity control operation of the optical head according to the embodiment shown in FIG. 3.

The operation of the embodiment will now be described. FIG. 4 is a timing chart showing the relations among a target velocity of the optical head in the velocity control of the embodiment, an actual velocity, a timing for velocity control, and a tracking error signal. In the diagram, a, b, c, and d denote inherent velocity control timings of a predetermined period and a', b', c', and d' indicate velocity control timings according to the embodiment. As shown in the diagram, the timings a', b', c', and d' coincide with the timings on the zero-cross point of the tracking error signal. The velocity control is executed synchronously with the zero-cross point indicative of the velocity detecting timing. For instance, the velocity control of a predetermined period at the point a waits to be performed until the next zero-cross point a'. The velocity control is executed at the point a'. With respect to the points b, c, and d as well, the velocity control is not similarly executed but is performed at the next zero-cross points b', c', and d', respectively. In this case, it is sufficient to calculate the target velocity of the optical head at each of the velocity control points in accordance with the above equation (1). Although the current velocity $V_n$ is detected by a well-known zero-cross counting method, it is now assumed that the current velocity $V_n$ is calculated by the following equation in consideration of the waiting time until the zero-cross point.

$$V_n = (\lambda/2 \cdot r_0)/\Delta t \qquad (4)$$

where, $r_0$: count value on the zero-cross point which is obtained by counting after the preceding velocity control $\Delta t$: addition value of the velocity control time interval and the waiting time until the next zero-cross point The velocity detection by the zero-cross counting method mentioned above is executed until the track which is preceding to the target track by two tracks. After that, a detecting method is switched to a method of detecting the velocity by counting a time interval between the zero-cross points. In FIG. 4, the velocity control by the velocity detection is performed after the point d'. In the embodiment, since the velocity control of the constant acceleration is executed, a steady deviation $V_e$ exists as shown in FIG. 4 However such a steady deviation can be compensated for by various well-known methods. The steady deviation $V_e$ is expressed by the following equation.

$$V_e = \alpha/\omega n = \alpha/(2\pi f_0) \quad (5)$$

where,
- $\alpha$: deceleration/acceleration in the velocity control profile
- $f_0$: velocity control zone The practical operation of the embodiment will now be described on the basis of the above fundamental idea. FIG. 5 is a flowchart showing the overall velocity control operation upon seeking of the optical head according to the embodiment. In FIG. 5, the number of tracks to be jumped (SK-TRACK) as the number of tracks from the present position of the optical head to the target position is supplied to the CPU 8 (step S31). A check is made to see if the number of tracks to be jumped is larger than two or not (S32). If YES, a velocity control period timer to perform a velocity control at a predetermined period of time is set (S33). When the number of tracks to be jumped is equal to or less than two, a timer to measure a period of interval of the half track is set (S34). A period of the velocity control period timer is set to 4 kHz here. After that, the operation to count the tracks is started (S35). A tracking servo loop is turned off (S36). Further, an acceleration pulse is set into the D/A converter 11 as an initial driving and is applied to the driver 10, thereby starting the driving of the linear motor 14 (S37). The initial setting is finished as mentioned above and until the head reaches the target track (S38), the main routine is set into the stand-by mode.

Figure 6:
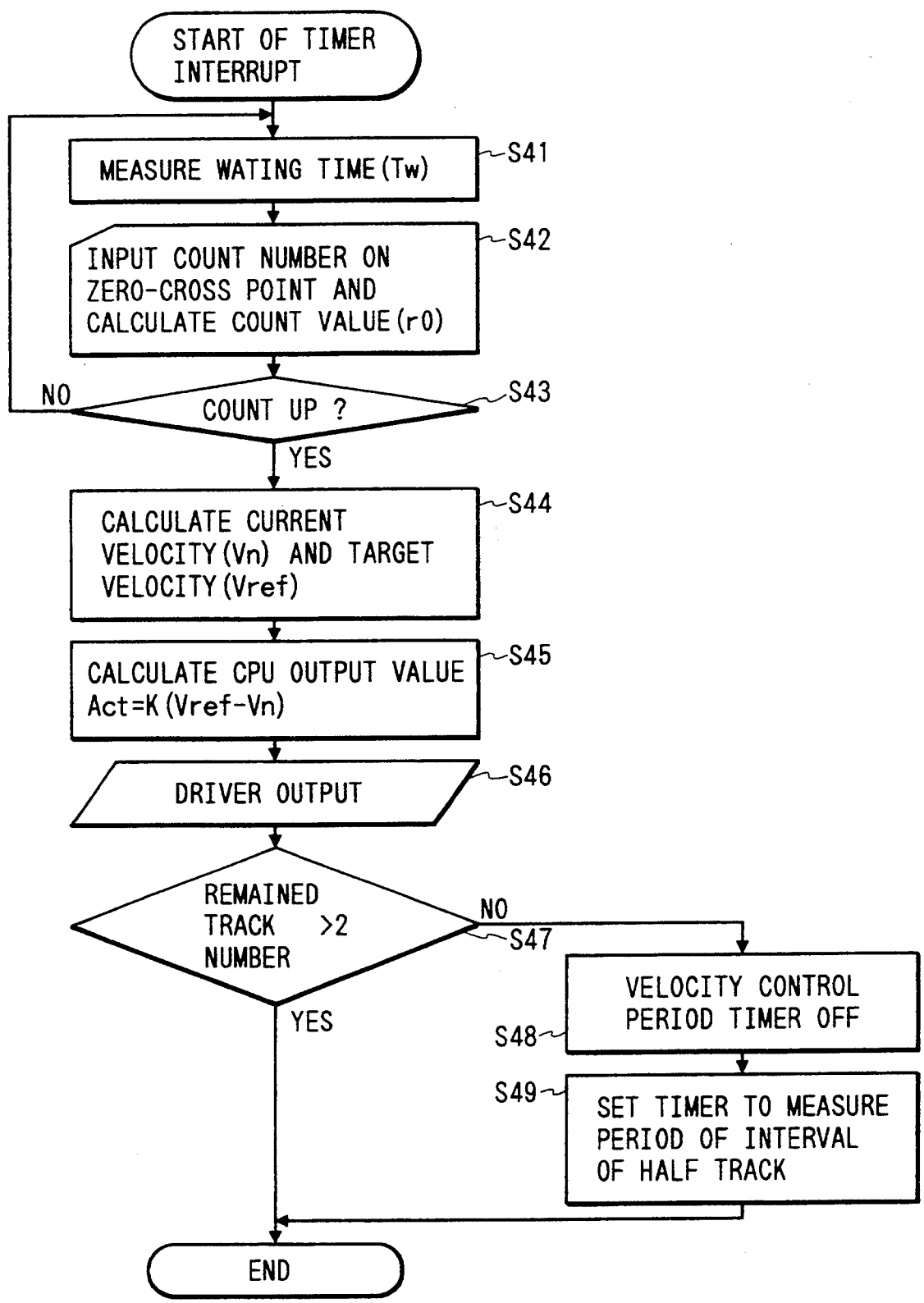
FIG. 6 is a flowchart showing an interrupting routine upon setting of a velocity control period timer in the flowchart shown in FIG. 5.

FIG. 6 shows an interrupting routine which is executed every predetermined period of the velocity control period timer set in step S33 in the case where the number of tracks to be jumped is larger than two. The period of the velocity control period timer corresponds to the period of the velocity control timing shown in FIG. 4 and the interrupting routine is executed for every predetermined period like a, b, c, and d. In the interrupting routine, the velocity control is not performed at the velocity control timing of a predetermined period as mentioned above but the control is postponed each time until the next zero-cross point of the tracking error signal and the velocity control is executed at this zero-cross point. In FIG. 6, processes to detect the velocities at the zero-cross points in steps S41 to S43 are performed. Step S41 corresponds to a process to measure a waiting time $t_w$ until the next zero-cross point for the velocity control timing of a predetermined period. The waiting time $t_w$ is measured by a timer function of the CPU 8. In a processing step S42, the count value N on the zero-cross point of the tracking error signal which is counted from the start of the seeking operation is supplied to the CPU 8 and, further, the count value (stored in the memory 9 every velocity control) until the preceding velocity control is subtracted from the count value N, thereby calculating the count value $r_0$ after the preceding velocity control. In step S43, the next zero-cross point is detected and the count value $r_0$ is counted up.

Figure 2:
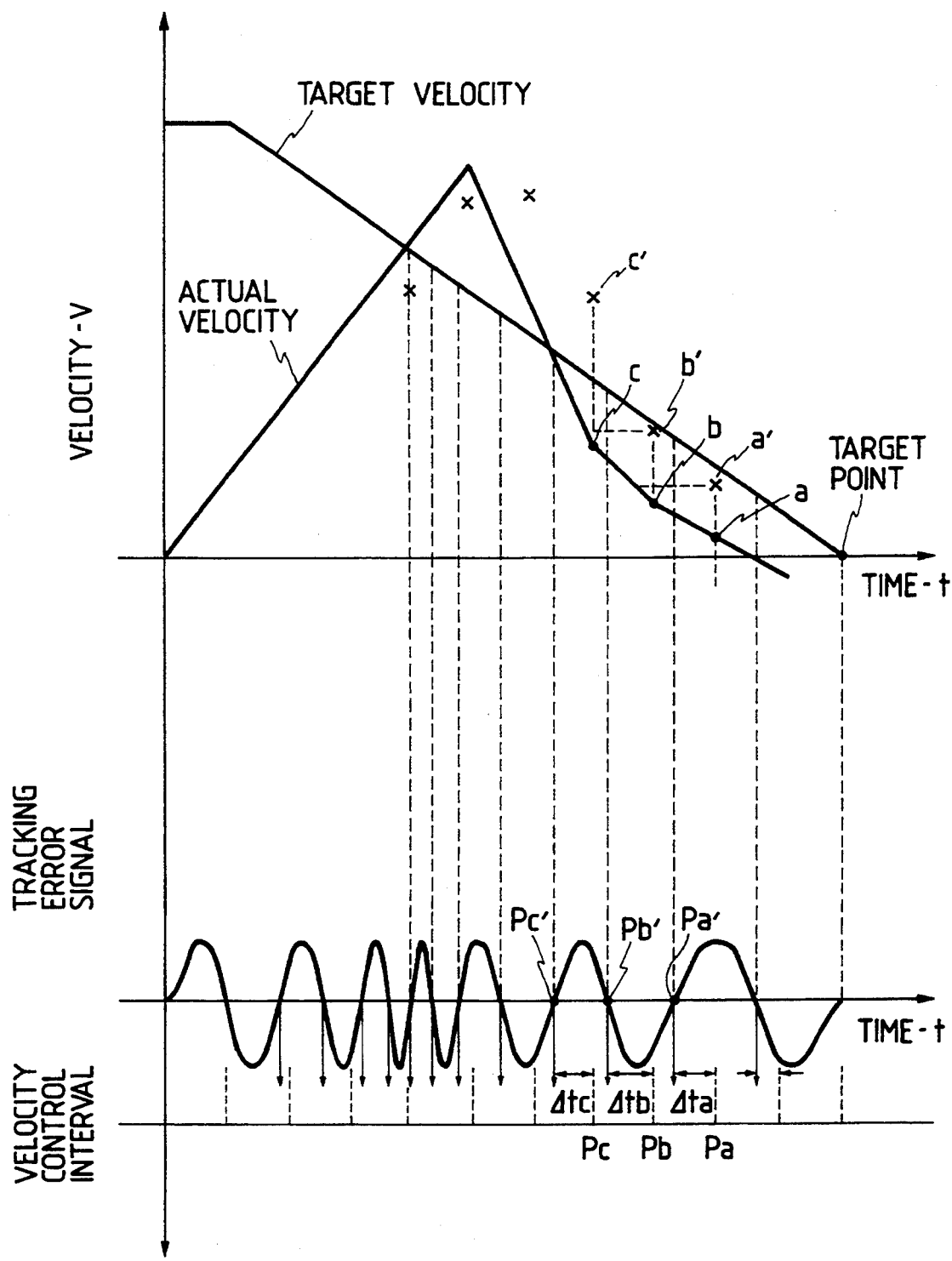
FIG. 2 is a timing chart showing the relations among the target velocity of the head, the actual velocity, the tracking error signal, and the velocity control timing in a conventional method of controlling the velocity at a predetermined period.

When the zero-cross point is detected, the CPU 8 calculates the current velocity $V_n$ at the zero-cross point and the target velocity $V_{ref}$ (S44) The CPU 8 calculates the command value to the driver 10 of the linear motor 14 from the current velocity and the target velocity obtained (S45). The current velocity $V_n$ is calculated by the foregoing equation (4) by using the time (velocity control interval + $t_w$) obtained in step S41 and the count value $r_0$ on the zero-cross point which has been counted up in step S43. The target velocity $V_{ref}$ is calculated by the equation (1). The command value $A_{ct}$ of the driver 10 is calculated by the equation (3). The command value obtained is sent to the D/A converter 11 via the I/O control unit 7 and is converted into the analog signal and is sent to the driver 10 after that (S46). In response to the analog command value given, the driver 10 drives the linear motor 14 and the optical head is controlled so that the velocity follows the target velocity. A check is now made to see if the number of remaining tracks until the target track reached is larger than two or not (S47). When the number of remaining tracks is larger than two, one interrupting routine is finished. The same processing routine is again executed at the point b as a velocity control timing of the next period shown in FIG. 2. The interrupting routine is sequentially executed at every predetermined period with respect to the points c and d. The processes are executed as mentioned above while approaching the target track. When it is determined that the number of remained tracks is equal to or less than two (S47), the velocity control period timer which has previously been set is turned off (S48). The timer to measure the time of interval of the half tracks is activated (S49). The interrupting routine is finished.

Figure 7:
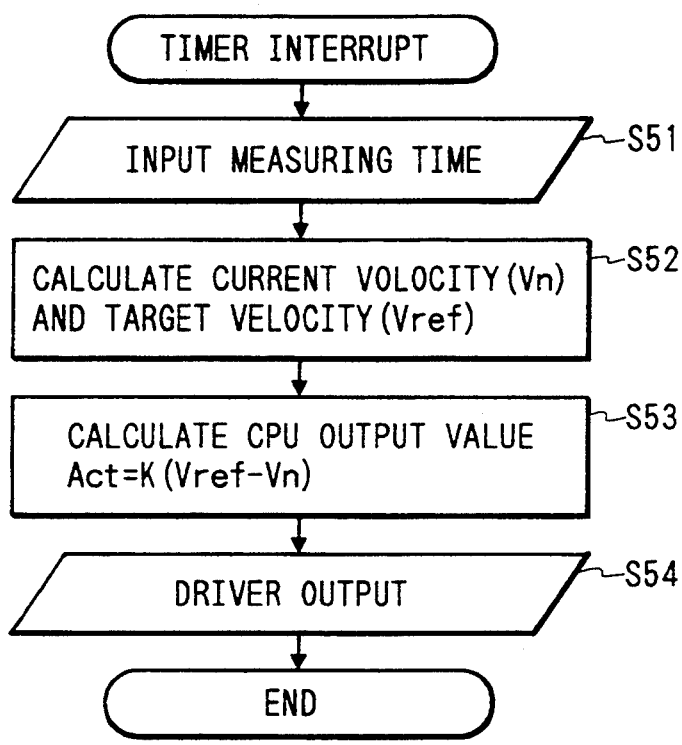
FIG. 7 is a flowchart showing a routine to measure and set the time of an interval of the half track in the flowchart shown in FIG. 5.

FIG. 7 is a flowchart showing the velocity control operation when the timer to measure the time of interval of the half track is set. In the velocity control, each time the zero-cross point is detected, the time interval between the zero-cross points is measured (S51). The result of the measurement is stored into a register (not shown) of the CPU 8. In FIG. 4, when the optical head reaches the point d', the timer starts the time counting operation and the time interval between the point d' and the next zero-cross point of the tracking error signal is measured. By using the measured time, the CPU 8 calculates the current velocity $V_n$ of the optical head by the foregoing equation (2) and also calculates the target velocity $V_{ref}$ by using the equation (1) (step S52). The CPU 8 subsequently calculates the command value from the current velocity and the target velocity obtained (S53) and supplies the command value to the driver 10 (S54). The command value of the driver 10 is calculated by the equation (3). One control operation is finished as mentioned above. Similar control is executed each time the zero-cross point is detected with respect to the next zero-cross point and the next zero-cross point and the like. As mentioned above, the optical head approaches the target track and when it reaches the target track in step S38 in FIG. 5, the velocity of the optical head is equal to 0 as shown in FIG. 4. Consequently, the optical head stops at a position where it reaches the target track and, further, the tracking servo is turned on and the seeking operation is finished.

In the embodiment as mentioned above, since the velocity control is performed synchronously with the velocity detection, the velocity detecting timing coincide with the velocity control timing and it is possible to eliminate the conventional problem such that an error occurs in the velocity due to a time delay. Therefore, since the control can be performed by using the accurate current velocity, as shown in FIG. 4, the optical head seeks to the target position while substantially following the target velocity. As will be obviously understood from the comparison with the conventional velocity profile shown in FIG. 2, the tracing performance to the target velocity can be remarkably improved as compared with the conventional case.

In the above embodiment, although the time has been measured by the timer function in the CPU 8, a timer or a counter having a similar time counting function can be also prepared on the outside. Although the embodiment has been described with respect to the optical disc apparatus as an example, the invention is not limited to such an example but can be also preferably applied to a recording and reproducing apparatus using a magnetic disc.

Another embodiment of the invention will be described.

In the above embodiment, when the number of tracks to be sought is larger than two, the velocity control is performed at a predetermined period. When it is equal to or less than two, the velocity control is executed each time the zero-cross point of the tracking error signal is detected. However, in the second embodiment, the velocity control is executed each time the zero-cross point of the tracking error signal is detected with regard to the whole seeking range.

Figure 8:
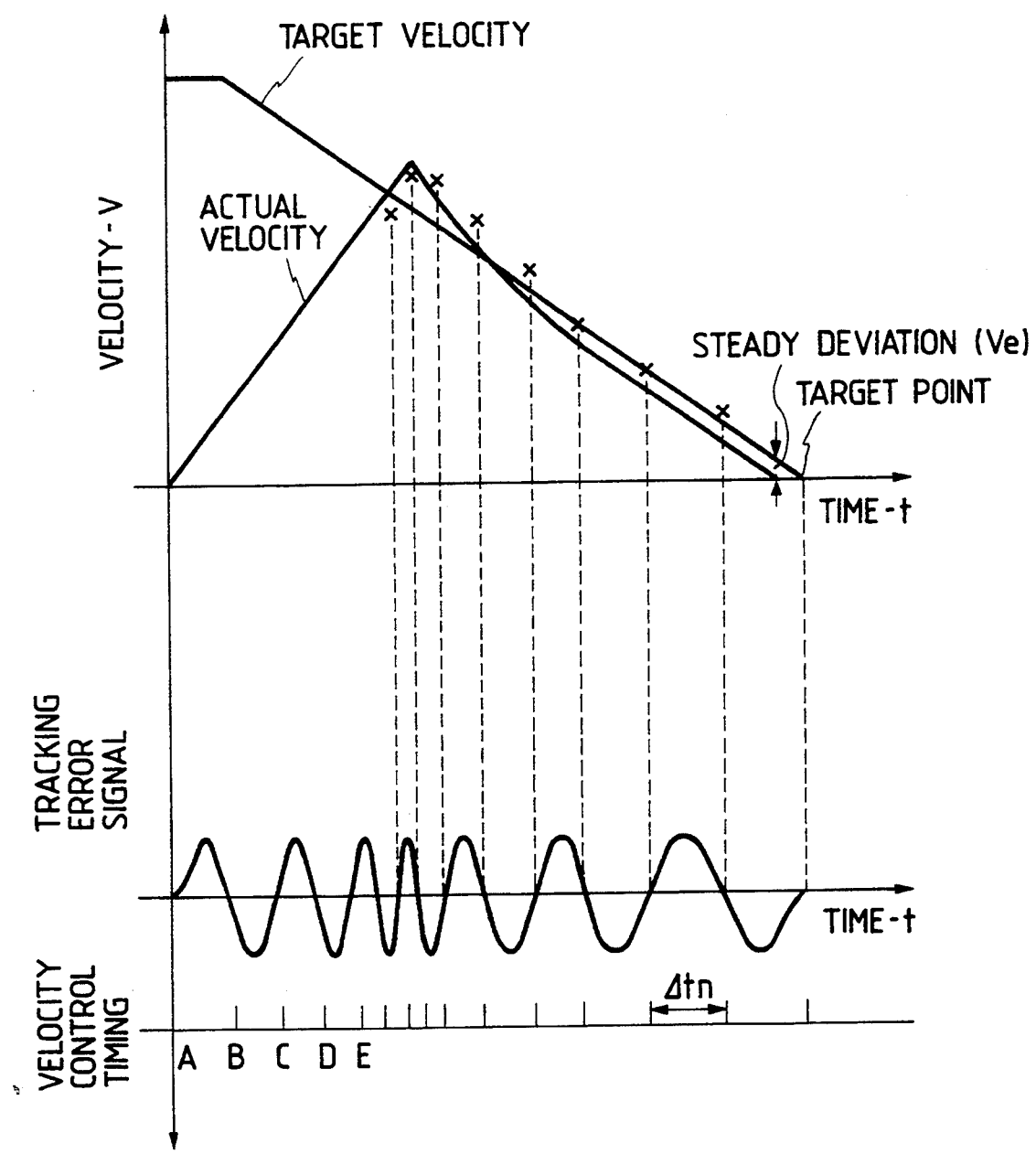
FIG. 8 is a timing chart showing the relations among the target velocity of the optical head, the actual velocity, the tracking error signal, and the velocity control timing in another velocity control of the optical head according to the embodiment shown in FIG. 3.

The operation of the second embodiment will now be described. The second embodiment is applied to the apparatus shown in FIG. 3 in a manner similar to the foregoing embodiment. FIG. 8 is a timing chart showing the relations among a target velocity of the optical head in the velocity control of the embodiment, an actual velocity, a tracking error signal, and a velocity control timing. FIG. 9 is flowchart showing the flow of processes for the velocity control, In FIGS. 8 and 9, the control operation when the optical head seeks in one direction (direction toward the inner periphery) of the optical disc 1 is shown as an example. First, when the control unit (not shown) instructs to seek the optical head to a predetermined target position, the number of tracks to be jumped between the present position of the optical head and the target position is first supplied to the CPU 8 as shown in FIG. 9 (step S31). The timer to measure the time of interval of the half track by the timer function of the CPU 8 is subsequently activated and the process to measure the time of the half period of the tracking error signal is executed (S32). In the process to measure the time interval of the half track, a timer interrupting routine is executed every zero-cross point as will be explained in detail hereinbelow. After that, the counting operation of the tracks is started (S33). The tracking servo loop is turned off (S34). Further, an acceleration pulse is set for the D/A converter 11 as an initial driving and applied to the driver 10, thereby starting the driving of the linear motor 14 (S35). The initialization is finished as mentioned above and until the optical head reaches the target track (S36), the main routine is set into the stand-by mode.

Figure 10:
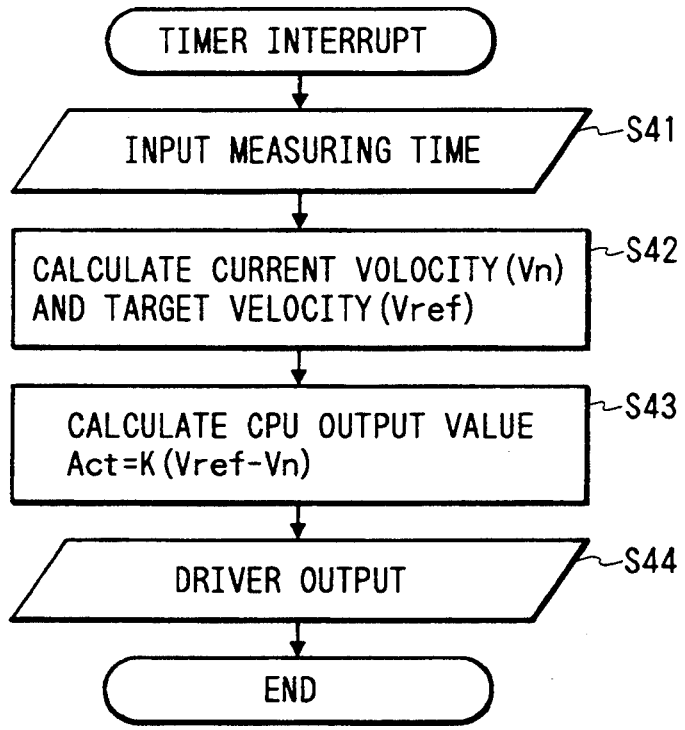
FIG. 10 is a flowchart showing a routine to measure and set a time of interval of the half track in the flowchart shown in FIG. 9.

FIG. 10 is a flowchart showing the above timer interrupting routine. In FIG. 10, the time measured until the first zero-cross point by the timer of the CPU 8 is first supplied to the CPU 8 (S41) and is stored into the register (not shown) of the CPU 8. Speaking in more detail, as a time which is measured here, the time which is required when the optical head moves over the half track, namely, the time from the initial point A of the tracking error signal to the point B as a first zero-cross point as shown in FIG. 8 is measured. The CPU 8 subsequently calculates the current velocity $V_n$ by the equation (2) by using the time obtained as mentioned above and also calculates the target velocity $V_{ref}$ by using the equation (1) (S42). Further, the CPU 8 calculates the command value of the driver 10 by the equation (3) by using the current velocity and the target velocity derived (S43) and supplied to the driver 10. Consequently, the driver 10 drives the linear motor 14 on the basis of the given command value. The optical head is controlled so as to be accelerated toward the target velocity. One control operation is finished as mentioned above. The timer to measure the time of interval of the half track is again activated in step S32 in FIG. 9. When the time interval until the point C as the next zero-cross point is measured, the timer interrupting routine in FIG. 10 is again executed. Each time the zero-cross point of the tracking error signal is detected such as point D of the next zero-cross point, the point E of the next zero-cross point, and the like, that is, each time the optical head moves over the track of half pitch, the command value is given to the driver 10 and the velocity of the optical head is sequentially controlled. Due to this, the velocity of the optical head linearly increases and, when it soon reaches the target velocity, the velocity of the optical head changes from the accelerating state to the decelerating state as shown in FIG. 8. In the decelerating zone as well, the CPU 8 also calculates the command value of the driver 10 from the current velocity and the target velocity every zero-cross point and controls the velocity of the optical head in substantially the same manner as mentioned above. Thus, the optical head velocity gradually decreases while tracing the target velocity as shown in FIG. 8 and the optical head approaches the target track, When the optical head reaches the target track in step S36 in FIG. 9, the velocity is equal to 0 and the optical head stops and the seeking operation is finished.

Figure 1:
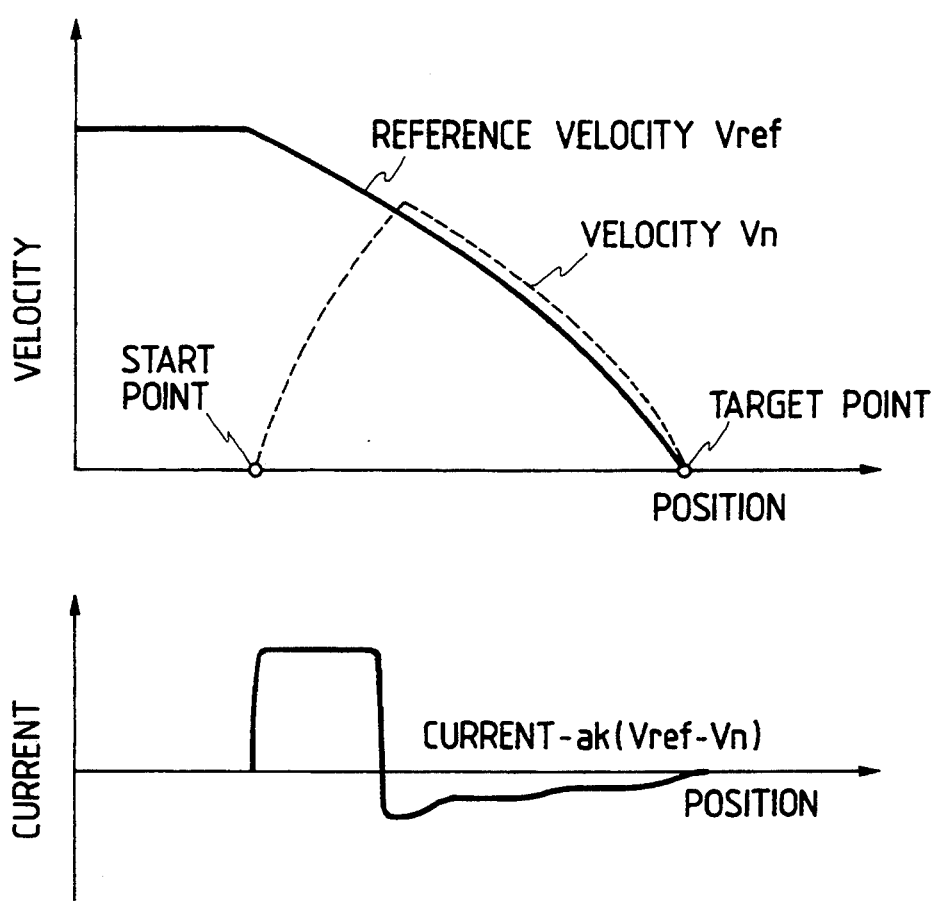
FIG. 1 is an explanatory diagram showing the relations among the reference velocity, the actual velocity, and the current applied to an actuator in a general velocity control method of a head.

In the embodiment as mentioned above, since the velocity control of the optical head is performed for every zero-cross point of the tracking error signal, a deviation of the timings of the velocity detection and the velocity control as in the conventional method doesn't occur. The detected velocity can be soon used in the velocity control. The problem such that an error occurs in the velocity can be solved. In FIG. 8, the detected velocities are shown by marks "x". As will be obviously understood from the diagram, the detected velocities are almost equal to the actual velocities. As compared with the conventional velocity error shown in FIG. 1, it will be understood that such an error is remarkably reduced. Therefore, as will be obviously understood from the comparison of the velocity profiles of FIGS. 8 and 1, the tracing performance to the target velocity can be extremely improved as compared with the conventional method. The seeking operation of the optical head can be accurately controlled.

Since the velocity control of the constant acceleration has been performed even in the above embodiment, the steady deviation $V_e$ exists as shown in FIG. 8. However, such a steady deviation can be compensated for by various well-known methods. The steady deviation $V_e$ is expressed by the following equation.

$$V_e = \alpha/\omega_n = \alpha/(2\pi f_0) \qquad (4)$$

where,

α: deceleration/acceleration in the velocity control profile $f_0$: velocity control zone Although the timer function of the CPU has been used to measure the time interval in the embodiment, a timer or a counter having a similar time counting function can be also prepared on the outside. Further, although the embodiment has been also described with respect to the optical disc apparatus as an example, in a manner similar to the case of the foregoing embodiment, the invention is not limited to such an example but can be also obviously applied to a magnetic disc recording apparatus or the like.

What is claimed is:

1. An information recording and reproducing apparatus in which an information recording or reproducing head is sought to a desired track on a recording medium having a plurality of tracks while velocity of the head is digitally-controlled, said apparatus comprising:

moving means for moving the head in such a direction as to traverse the tracks;

detecting means for detecting a tracking error signal which is generated when the head is moved by said moving means;

counting means for counting an appearance of a specific value of the tracking error signal detected by said detecting means;

generating means for generating timing with a constant period;

calculating means for calculating a target velocity of the head on the basis of the specific value counted by said counting means;

first detection means for detecting a current velocity of the head on the basis of the constant time period and the specific value counted by said counting means;

measuring means for measuring a time of an appearance interval of the specific value;

second detection means for detecting a current velocity of the head on the basis of a moving distance of the head which corresponds to the measured time and the appearance interval of the specific value;

means for producing a control signal of the head which corresponds to a difference between the current velocity detected by said first detection means and the target velocity when the head is moving at high speed, and a control signal of the head which corresponds to a difference between the current velocity detected by said second detection means and the target velocity synchronously with the detection of the current velocity by said second detection means when the head is moving at low speed; and means for driving said moving means on the basis of the control signal.

2. An apparatus according to claim 1, wherein said counting means effects counting of an appearance of a zero-crossing point of the digital signal, said second detection means comprises means for measuring a time between the zero-cross points of the tracking error signal and produces the current velocity on the basis of the following equation:

$$\text{current velocity} = \lambda/2 \times 1/\Delta t$$

where,
$\lambda$: track pitch
$\Delta t$: time between zero-cross points of the tracking error signal.

3. An apparatus according to claim 1, wherein said counting means effects counting of an appearance of a zero-cross point of the tracking error signal of the digital signal, and said target velocity calculating means detects the target velocity on the basis of the following equation:

$$\text{target velocity} = [2 \cdot \alpha (S - N \cdot \lambda/2)]^{\frac{1}{2}}$$

where,
S: target moving distance
$\alpha$: deceleration or acceleration
$\lambda$: track pitch
N: number of occurrences of a zero-cross point of tracking error signal from a seeking operation.

4. An apparatus according to claim 1, wherein the head is an optical head.

5. An apparatus according to claim 1, wherein said counting means effects counting of an appearance of a zero-crossing point of the digital signal, and said first detection means comprises means for measuring a time from the timing generated by said timing generating means to an occurrence of a next zero-cross point, and produces the current velocity on the basis of the following equation:

$$\text{current velocity} = (\lambda/2 \times r_0)/\Delta t$$

where,
$\lambda$: track pitch
$\Delta t$: a time of one period of timing generated by said timing generating means plus a time from a timing generated by said timing generating means to an occurrence of a next zero-cross point
$r_0$: counted value corresponding to one period.

6. An information recording and reproducing method in which an information recording or reproducing head is sought to a desired track on a recording medium having a plurality of tracks while velocity of the head is digitally-controlled, said method comprising the steps of:

moving the head by an actuator in such a direction as to traverse the tracks;

detecting a tracking error signal which is generated when the head is moved in said moving step;

counting an appearance of a specific value of the tracking error signal;

generating a timing with a constant period;

calculating a target velocity of the head on the basis of a value counted in said counting step;

first detecting a current velocity of the head, on the basis of the constant time period and the value counted in said counting step;

measuring a time of an appearance interval of the specific value;

second detecting a current velocity of the head, on the basis of a moving distance of the head which corresponds to the measured time and the appearance interval of the specific value;

producing a control signal of the head which corresponds to a difference between the current velocity detected in said first detection step and the target velocity when the head is moving at high speed, and a control signal of the head which corresponds to a difference between the current velocity detected in said second detection step and the target velocity synchronously with the detection of the current velocity in said second detection step when the head is moving at low speed; and driving the actuator on the basis of the control signal.

* * * * *

UNITED STATES PATENT AND TRADEMARK OFFICE
CERTIFICATE OF CORRECTION

PATENT NO. : 5,428,590
DATED : June 27, 1995
INVENTOR(S) : TSUKASA OGINO

It is certified that error appears in the above-indentified patent and that said Letters Patent is hereby corrected as shown below:

IN THE DRAWINGS:

Figure 6, in step S41, "WATING" should read --WAITING--.
Figure 10, in step S42, "VOLOCITY" should read --VELOCITY--.

COLUMN 1:

Line 48, "For signal" should read --For instance, the zero-cross point of a tracking error signal--;
Line 49, "instance, the zero-cross point of a" should read --from the zero-cross point to the next zero-cross--;
Line 50, "tracking error" should be deleted;
Line 51, "from the zero-cross point to the next zero-" should be deleted; and
Line 52, "cross" should be deleted.

COLUMN 2:

Line 7, "to" should be deleted; and
Line 39, "to" should be deleted.

UNITED STATES PATENT AND TRADEMARK OFFICE
CERTIFICATE OF CORRECTION

PATENT NO. : 5,428,590
DATED : June 27, 1995
INVENTOR(S) : TSUKASA OGINO

It is certified that error appears in the above-indentified patent and that said Letters Patent is hereby corrected as shown below:

COLUMN 3:

Line 68, "is" should read --in--.

COLUMN 4:

Line 67, "FIG. 4" should read --FIG. 4.--.

COLUMN 5:

Line 64, "(S44)" should read --(S44).--.

COLUMN 6:

Line 13, "track" should read --track is--;
Line 23, "remained" should read --remaining--; and
Line 61, "cide" should read --cides--.

COLUMN 8:

Line 31, "track," should read --track.--.

Signed and Sealed this

Twenty-fourth Day of October, 1995

Attest:

BRUCE LEHMAN

*Attesting Officer*   Commissioner of Patents and Trademarks